United States Patent [19]

Cameron et al.

[11] Patent Number: 4,895,016
[45] Date of Patent: Jan. 23, 1990

[54] TIMING PIN ASSEMBLY

[76] Inventors: Charles M. Cameron, 904 Briar Ct.; George R. Waymack, 1529 Hellwig Rd., #15, both of Cheyenne, Wyo. 82007

[21] Appl. No.: 257,430

[22] Filed: Oct. 13, 1988

[51] Int. Cl.$^4$ .......................................... G01M 15/00
[52] U.S. Cl. ......................................... 73/116; 33/600
[58] Field of Search ................. 73/116; 33/601, 607, 33/611, 600; 123/164, 343

[56] References Cited

U.S. PATENT DOCUMENTS

| 2,437,283 | 3/1948 | Viers | 116/124 |
| 2,443,135 | 6/1948 | Glotfelty | 116/124 |
| 2,734,477 | 2/1956 | Rose | 116/124 |
| 2,741,213 | 4/1956 | Berry | 116/124 |
| 2,763,066 | 9/1956 | Garrison | 33/174 |
| 3,759,072 | 9/1973 | McLarnon | 70/104 X |
| 3,988,925 | 11/1976 | Seccombe | 73/119 R |
| 4,455,865 | 6/1984 | Davenport et al. | 73/116 |
| 4,683,747 | 8/1987 | Hall | 73/119 R |

FOREIGN PATENT DOCUMENTS 501631   3/1939   United Kingdom ................. 74/813

Primary Examiner—Jerry W. Myracle
Attorney, Agent, or Firm—Dean P. Edmundson

[57] ABSTRACT

A timing pin assembly for insertion into an aperture in the bell housing of an engine to be timed. The assembly includes a pin carried by a housing and projecting outwardly from the housing. The pin is urged to its outward position by a spring and is retractable into the housing. When the pin is in its extended position it engages a detent in the flywheel of the engine and prevents the flywheel from turning while the engine is timed.

7 Claims, 2 Drawing Sheets

TIMING PIN ASSEMBLY

FIELD OF THE INVENTION

This invention relates to engine repair accessories. More particularly, this invention relates to techniques used in timing of engines. Even more particularly, this invention relates to techniques for locking or securing the flywheel of an engine so that the engine can be timed.

BACKGROUND OF THE INVENTION

In the timing of an engine the valves must be adjusted relative to the angular position of the crankshaft so that the respective valves open and close at the proper time. Many engines include a mark on the flywheel which can be viewed as an aid in timing procedures.

However, some engines do not include a visual marker to indicate the angular position of the flywheel so that the engine can be timed. In such engines the flywheel is enclosed with a bell housing, and the bell housing may include one or two apertures. A bolt can be inserted through one of such apertures to engage a detent or recess in the flywheel. When the bolt engages the detent the flywheel is locked in position and cannot rotate. Then the appropriate adjustments to the valves, etc. can be made to properly time the engine.

The procedure of inserting a bolt through an aperture in the bell housing to lock the flywheel, however, requires two workmen. One must insert the bolt while the other turns the engine until the flywheel is in the proper position so that the detent is in alignment with the bolt.

There has not heretofore been provided a simple, easy to use, and efficient means for aligning the flywheel with the aperture in the bell housing and securing the flywheel against rotational movement during repair procedures.

SUMMARY OF THE PRESENT INVENTION

In accordance with the present invention there is provided a timing pin assembly for insertion into an aperture in a bell housing of an engine to be timed. The engine includes a flywheel having at least one detent facing the aperture in the bell housing.

The timing pin assembly includes:

(a) a tubular housing having first and second ends, the first end including an opening;

b) an elongated pin member slidably received in the tubular housing through the opening; the pin being movable between extended and retracted positions; and (c) bias means within the housing which is adapted to urge the pin member to its extended position.

The first end of the tubular housing is fitted into the aperture in the bell housing. For example, the end of the tubular housing may be threaded. The bias means is adapted to urge the pin to its extended position in a manner such that the first end of the pin will extend into the detent in the flywheel to lock the flywheel against movement. Then the engine may be timed. The pin engages the detent and prevents the flywheel from turning. After timing the engine the pin assembly is removed.

The main advantage of the pin assembly of this invention is that only one workman is required to lock the flywheel in the necessary position. Because the pin is biased to its extended position, one person can rotate the engine until the pin is urged into the detent in the flywheel.

Other advantages of the pin assembly of the invention will become apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
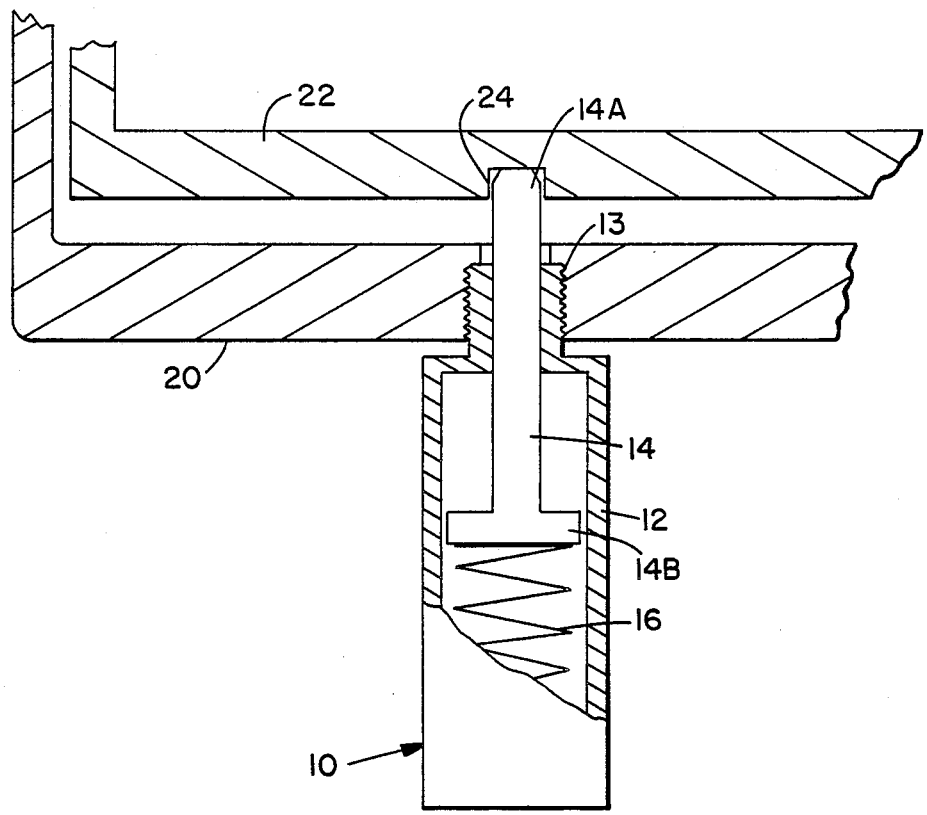
FIG. 1 is a partially cut-away side view of a bell housing and flywheel illustrating the manner in which the timing pin assembly locks the flywheel in a fixed position for timing purposes.

In FIG. 1 there is illustrated one embodiment of timing pin assembly 10 of the invention which is shown secured in an aperture in a bell housing 20 of an engine including a flywheel 22. The flywheel includes at least one detent or recess 24 near the outer edge thereof, as illustrated.

The timing pin assembly includes an elongated tubular housing 12 having an opening at one end 13 thereof. End 13 is preferably also threaded so that it will threadably engage a threaded aperture in the bell housing.

Pin member 14 includes a first end 14A and a second, enlarged, head portion 14B. The head portion is captured within the tubular housing 12 and the first end 14A passes through the opening in the end 13 of the housing. Spring member 16 urges the pin 14 to its extended position. The pin moves freely within housing 12, subject to the action of the spring which urges the pin outwardly. Preferably a drop of oil or other suitable lubricant is applied periodically to the pin to facilitate free sliding movement.

The outer end 14A of the pin 14 is preferably slightly tapered, as illustrated. This facilitates movement of the end of the pin into the detent 24 in the flywheel.

The bell housing of the engine (e.g., a CATERPILLAR brand 3406 truck engine) includes a plug in the aperture. This plug is first removed and then the end 13 of the timing pin assembly housing is threaded into the aperture. The spring 16 urges the pin 14 outwardly toward the flywheel. Then the engine is rotated until the end 14A of the pin engages the detent 24 in the flywheel, whereupon the flywheel becomes locked in a fixed position. Then the engine can be timed.

After all the required adjustments and settings are made while the engine is in one fixed position, the timing pin assembly is removed so that the engine can again be rotated. In certain engines the flywheel includes two detents and various settings and adjustments must be made to the engine while the flywheel is locked first in one position and then in another position. In such event the timing pin assembly is inserted a second time so as to lock the flywheel in a second required position for making settings on the engine.

Figure 2:
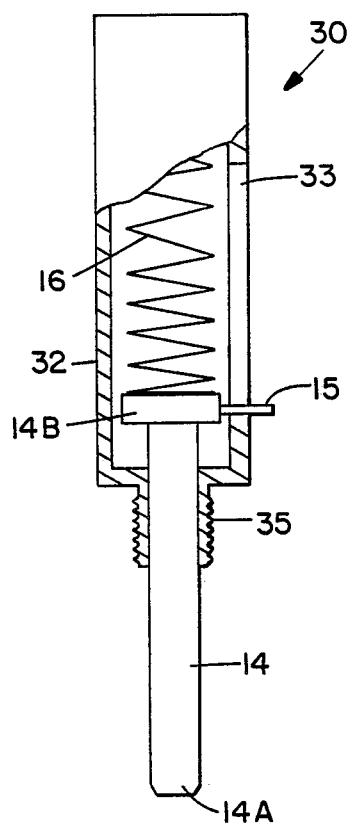
FIG. 2 is a side elevational, partial cut-away, view of another embodiment of timing pin assembly of this invention.
Figure 3:
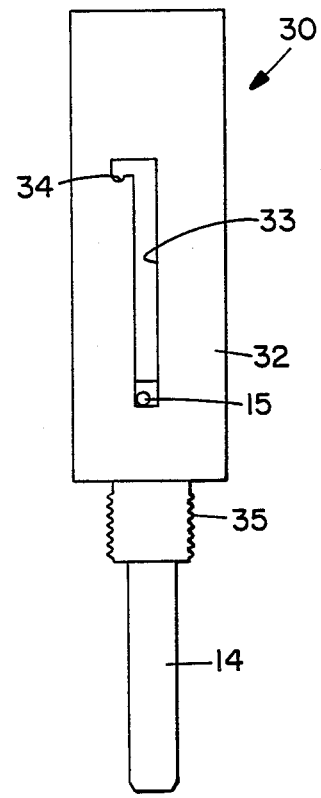
FIG. 3 is a front elevational view of the embodiment of timing pin assembly shown in FIG. 2.

In FIG. 2 and 3 there is illustrated another embodiment of timing pin assembly 30 including elongated tubular housing 32, pin 14, and coiled spring 16. One end 35 of the housing is threaded so as to facilitate insertion into the threaded aperture in the bell housing. Pin 14 is able to slide within the housing between an extended and a retracted position. The spring 16 urges the pin outwardly toward its extended position.

A finger 15 secured to the enlarged head 14B of the pin extends outwardly through longitudinal slot 33 in housing 32. Finger 15 enables the pin to be moved to its retracted position, when desired. The upper end of slot 33 includes a horizontal portion 34 which serves as retention means to retain the finger 15 (and the pin 14) in the retracted position. Then the engine can be rotated to a desired position without removing the entire pin assembly from the bell housing. Then the finger can be moved out of the horizontal slot 34 and into the longitudinal slot 33 to allow the spring to urge the pin outwardly again.

Other variants are possible without departing from the scope of this invention.

What is claimed is:

1. A timing pin assembly for insertion into a threaded aperture in a bell housing of an engine to be timed, wherein said engine includes a flywheel within said bell housing, and wherein said flywheel includes at least one detent, said timing pin assembly comprising:
   (a) a tubular housing having first and second ends; wherein said first end includes an opening; wherein said first end is threaded and is adapted to be threadably secured in said aperture;
   (b) an elongated pin member slidably received in said tubular housing through said opening; said pin member having first and second ends; wherein said pin member is movable between extended and retracted positions; wherein said first end is tapered;
   (c) bias means within said housing which is adapted to urge said pin member to said extended position; wherein said bias means comprises a spring; wherein said bias means is adapted to urge said pin member to said extended position in a manner such that said first end of said pin member extends into said detent to lock said flywheel against movement; wherein said housing includes an elongated longitudinal slot therein; said assembly further comprising retraction means carried by said second end of said pin member; wherein said retraction means projects through said slot in said housing.

2. A timing pin assembly in accordance with claim 1, wherein said housing comprises aluminum.

3. A timing pin assembly in accordance with claim 1, wherein said retraction means comprises a finger.

4. A timing pin assembly in accordance with claim 3, wherein said longitudinal slot includes first and second ends, wherein said first end of said slot includes retention means adapted to retain said finger when said pin member is in said retracted position.

5. A timing pin assembly for insertion into an aperture in a bell housing of an engine to be timed, wherein said engine includes a flywheel within said bell housing, and wherein said flywheel includes at least one detent, said timing pin assembly comprising:
   (a) a tubular housing having first and second ends and a longitudinal opening therein; wherein said first end is threaded; wherein said housing includes an elongated longitudinal slot therein; wherein said longitudinal slot includes first and second ends, wherein said first end of said slot includes retention means adapted to retain said finger when said pin member is in said retracted position;
   (b) an elongated pin member slidably received in said tubular housing through said opening; said pin member having first and second ends; wherein said pin member is movable between extended and retracted positions;
   (c) bias means within said housing which is adapted to urge said pin member to said extended position;
   (d) retraction means carried by said second end of said pin member and projecting through said slot in said housing; wherein said retraction means comprises a finger; wherein said bias means is adapted to urge said pin member to said extended position in a manner such that said first end of said pin member extends into said detent to lock said flywheel against movement.

6. A method for securing the flywheel against rotation within a bell housing of an engine; wherein said flywheel includes at least one detent and said bell housing includes a threaded aperture which permits access to said detent; said method comprising the steps of:
   (a) providing a timing pin assembly comprising:
      (i) a tubular housing having first and second ends and a longitudinal opening therein; wherein said first end is threaded; wherein said tubular housing includes an elongated longitudinal slot therein;
      (ii) an elongated pin member slidably received in said tubular housing through said opening; said pin member having first and second ends; wherein said pin member is movable between extended and retracted positions;
      (iii) bias means within said housing which is adapted to urge said pin member to said extended position;
      (iv) retraction means carried by said second end of said pin member and projecting through said slot in said tubular housing;
   (b) threading first end of said tubular housing into said threaded aperture of said bell housing;
   (c) rotating said flywheel until said detent is aligned with said pin member, whereby said first end of said pin member is urged into said detent by said bias means to thereby lock said flywheel against rotational movement.

7. A method in accordance with claim 6, wherein said retraction means comprises a finger; wherein said longitudinal slot includes first and second ends; and wherein said first end of said slot includes retention means adapted to retain said finger when said pin member is in said retracted position.

* * * * *